United States Patent
Takeda (10) Patent No.: US 9,989,825 B2
(45) Date of Patent: Jun. 5, 2018

(54) DISPLAY DEVICE

(71) Applicant: Japan Display Inc., Minato-ku (JP)

(72) Inventor: Arihiro Takeda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/049,354

(22) Filed: Feb. 22, 2016

(65) Prior Publication Data

US 2016/0252788 A1 Sep. 1, 2016

(30) Foreign Application Priority Data

Feb. 26, 2015 (JP) ................................. 2015-036421

(51) Int. Cl.
*G02F 1/1362* (2006.01)
*G02F 1/1368* (2006.01)
*G02F 1/1335* (2006.01)

(52) U.S. Cl.
CPC ...... *G02F 1/136209* (2013.01); *G02F 1/1368* (2013.01); *G02F 2001/13685* (2013.01); *G02F 2001/133562* (2013.01)

(58) Field of Classification Search
None
See application file for complete search history.

(56) References Cited

U.S. PATENT DOCUMENTS

| | | | |
|---|---|---|---|
| 2004/0125261 A1* | 7/2004 | Lee .................... | G02F 1/136209 349/43 |
| 2005/0140875 A1* | 6/2005 | Jeoung .............. | G02F 1/133555 349/114 |
| 2006/0023135 A1* | 2/2006 | Park .................. | G02F 1/136204 349/40 |
| 2011/0096009 A1* | 4/2011 | Kurokawa ........... | G06F 3/0412 345/173 |
| 2012/0249936 A1* | 10/2012 | Zi ....................... | H01L 27/1288 349/106 |
| 2014/0240617 A1* | 8/2014 | Fukutome ........... | G02F 1/13338 349/12 |
| 2015/0185565 A1* | 7/2015 | Park .................. | G02F 1/134363 349/43 |

FOREIGN PATENT DOCUMENTS

JP 2011-215471 10/2011

* cited by examiner

*Primary Examiner* — Dennis Y Kim
(74) *Attorney, Agent, or Firm* — Oblon, McClelland, Maier & Neustadt, L.L.P.

(57) ABSTRACT

According to one embodiment, a display device includes a first substrate including a first insulating substrate, and a second substrate including a second insulating substrate arranged on a display surface side on which an image is displayed to the first substrate, a light-shielding layer arranged on a side of the second insulating substrate, which is opposed to the first substrate, a gate line and a source line arranged on a side of the light-shielding layer, which is opposed to the first substrate, to extend along the light-shielding layer, a switching element electrically connected to the gate line and the source line, and a pixel electrode electrically connected to the switching element.

6 Claims, 10 Drawing Sheets

FIG. 12

DISPLAY DEVICE

CROSS-REFERENCE TO RELATED APPLICATIONS

This application is based upon and claims the benefit of priority from Japanese Patent Application No. 2015-036421, filed Feb. 26, 2015, the entire contents of which are incorporated herein by reference.

FIELD

Embodiments described herein relate generally to a display device.

BACKGROUND

A liquid crystal display device comprising an array substrate and a counter-substrate, in which the array substrate includes a color filter layer composed of a color layer and a light-shielding layer, and a switching element layer disposed on an upper layer of the color filter layer, is well known as an example of a display device. In such a liquid crystal display device, non-uniformity in display resulting from non-uniform cell gap between the array substrate and the counter-substrate is required to be suppressed.

DETAILED DESCRIPTION

In general, according to one embodiment, a display device includes: a first substrate including a first insulating substrate; and a second substrate including a second insulating substrate arranged on a display surface side on which an image is displayed to the first substrate, a light-shielding layer arranged on a side of the second insulating substrate, which is opposed to the first substrate, a gate line and a source line arranged on a side of the light-shielding layer, which is opposed to the first substrate, to extend along the light-shielding layer, a switching element electrically connected to the gate line and the source line, and a pixel electrode electrically connected to the switching element.

According to another embodiment, a display device includes: a first substrate including a first insulating substrate and a common electrode arranged above the first insulating substrate; a second substrate including a second insulating substrate arranged on a display surface side on which an image is displayed to the first substrate, a gate line and a source line arranged on a side of the second insulating substrate, which is opposed to the first substrate, a switching element electrically connected to the gate line and the source line, and a pixel electrode electrically connected to the switching element and opposed to the common electrode; a liquid crystal layer held between the first substrate and the second substrate; and a circular polarizer arranged on the display surface side of the second substrate.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict Lhe interpretation of the invention. In the present specification and drawings, elements like or similar to those in the already described drawings may be denoted by similar reference numbers and their detailed descriptions may be arbitrarily omitted.

In the present embodiment, a liquid crystal display device is explained as an example of the display device. The display device can be used for, for example, various devices such as a smartphone, a tablet terminal, a mobile telephone terminal, a personal computer, a TV receiver, a vehicle-mounted device, and a game console. The major configuration explained in the present embodiment can also be applied to a self-luminous display device comprising an organic electroluminescent display element and the like, an electronic paper display device comprising a cataphoretic element and the like, a display device employing micro-electro-mechanical systems (MEMS), or a display device employing electrochromism.

Figure 1:
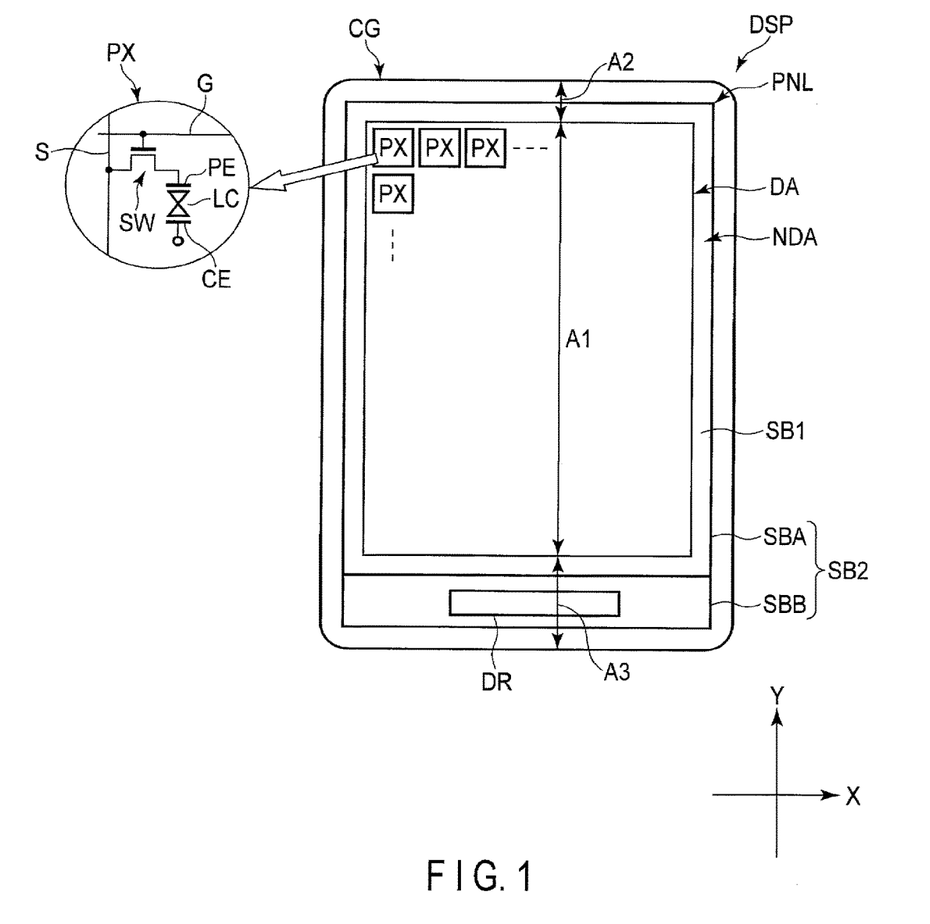
FIG. 1 is a plan view showing a configuration example of a display device DSP of one of the embodiments.

FIG. 1 is a plan view showing a configuration example of a display device DSP of one of the embodiments. A perspective view in an X-Y plane defined by a first direction X and a second direction Y which intersect each other, is illustrated here.

The display device DSP comprises a display panel PNL. The display panel PNL is, for example, a liquid crystal display panel and includes a first substrate SB1, a second substrate SB2 arranged to be opposed to the first substrate SB1, and a liquid crystal layer LC formed between the first substrate SB1 and the second substrate SB2. The display panel PNL includes a display area DA on which an image is displayed and a frame-shaped non-display area NDA surrounding the display area DA. The display area DA is composed of a plurality of pixels PX arrayed in a matrix.

In addition, the display panel PNL includes in the display area DA a gate line G, a source line S, a switching element SW electrically connected to the gate line G and the source line S in each pixel PX, a pixel electrode PE electrically connected to the switching element SW in each pixel PX, a common electrode CE opposed to the pixel electrode, and the like. For example, the gate line G extends in the first direction X and the source line S extends in the second direction Y, but the gate line G and the source line S may be bent or may be branched in part. The switching element SW is formed of, for example, a thin film transistor. The gate line G, the source line S, the switching element SW, and the pixel electrode PE are arranged on, for example, a second substrate SB2. The common electrode CE of a common potential is arranged on the first substrate SB1 or the second substrate SB2 so as to be arranged over a plurality of pixels PX.

The second substrate SB2 has an outer shape larger than the first substrate SB1. In other words, the second substrate SB2 includes a counter portion SBA opposed to the first substrate SB1 and a mounting portion SBB located on a side outer than the counter portion SBA. In the example illustrated, the mounting portion SBB corresponds to a portion extending further than the counter portion SBA along the second direction Y, on the second substrate SB2. A signal supply source necessary to drive the display panel PNL such as a driving IC chip DR is mounted on the mounting portion SBB.

The display device DSP of the example illustrated further comprises a cover glass CG. The cover glass CG has an outer shape larger than the display panel PNL. For example, the cover glass CG extends to the side outer than the second substrate SB2 along the first direction X and the second direction Y.

The detailed configuration of the display panel PNL is not explained here but, in a display mode using a longitudinal field along the normal to the main surface (X-Y plane) of the substrate or a display mode using a tilted electric field which is tilted obliquely with respect to the main surface of the substrate, the pixel electrode PE is arranged in one of the substrates (for example, the second substrate SB2) while the common electrode CE is arranged in the other substrate (for example, the first substrate SB1). In addition, both the pixel electrode PE and the common electrode CE are arranged in the same substrate (for example, the second substrate SB2), in a display mode using a lateral electric field extending along the main surface of the substrate. Furthermore, the display panel PNL may be configured so as to correspond to a display mode using an arbitrary combination of the above-explained longitudinal, lateral, and tilted electric fields.

The display panel PNL is a transmissive display panel having a transmissive display function to display an image by, for example, selectively transmitting the light from a backlight unit to be explained later, but is not limited to this example. For example, the display panel PNL may be a reflective display panel having not only the transmissive display function, but also a reflective display function of displaying an image by selectively reflecting light from the display surface side, such as external light and auxiliary light. In addition, the display panel PNL may be a transreflective display panel having the transmissive display function and the reflective display function.

Figure 2:
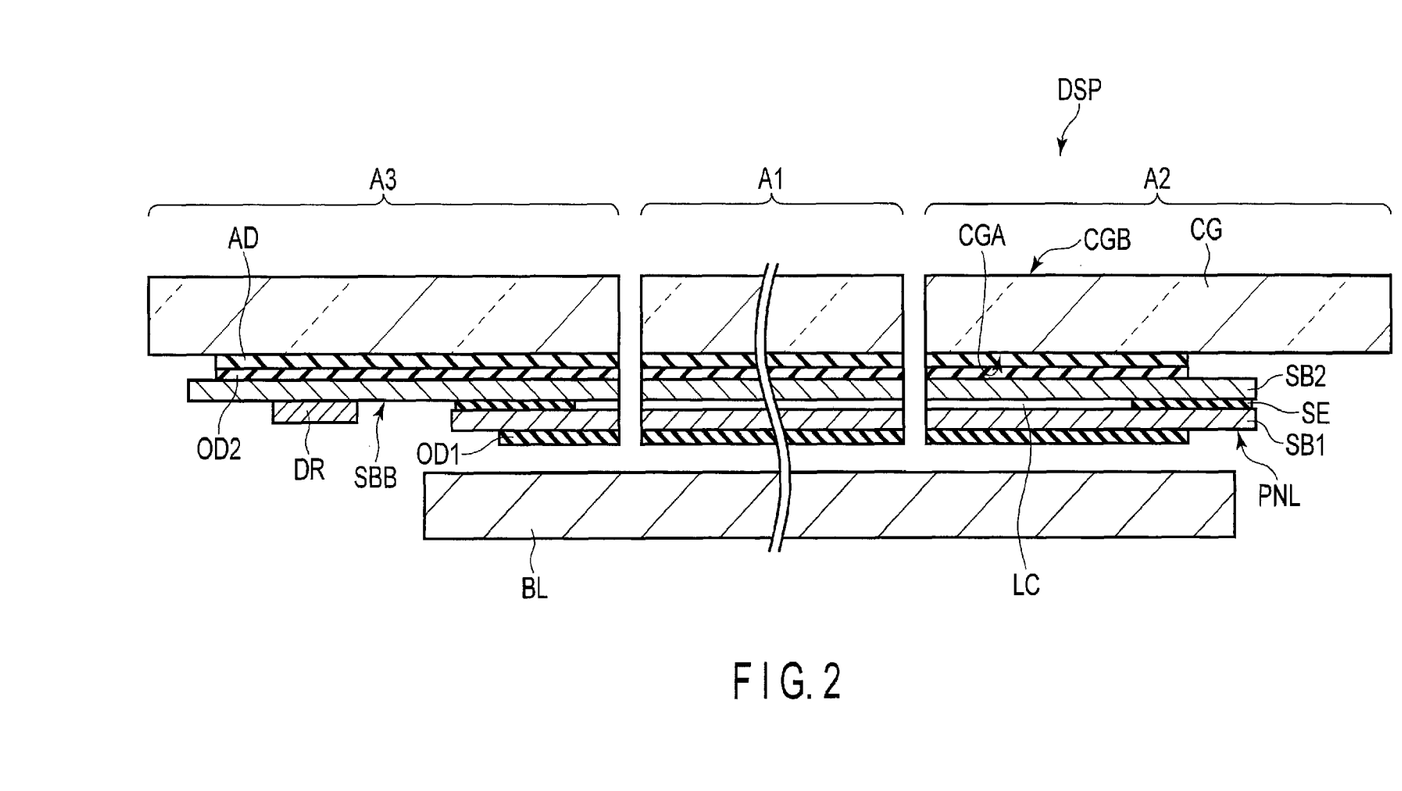
FIG. 2 is a cross-sectional view showing the display device DSP shown in FIG. 1 seen along the second direction Y.

FIG. 2 is a cross-sectional view showing the display device DSP shown in FIG. 1 seen along the second direction Y. Sections of a first area A1 corresponding to the display area DA, and a second area A2 and a third area A3 including the non-display area NDA are illustrated.

The display device DSP comprises a backlight unit BL, a first optical element OD1 and a second optical element OD2 in addition to the display panel PNL and the cover glass CG.

The first substrate SB1 and the second substrate SB2 are applied to each other by a sealing member SE with a predetermined cell gap formed between the substrates, on the display panel PNL. A liquid crystal layer LC is held on an inner side surrounded by the sealing member SE in the cell gap between the first substrate SB1 and the second substrate SB2. The signal supply source such as the driving IC chip DR mounted on the mounting portion SBB of the second substrate SB2 faces a side opposite to the cover glass CG, i.e., the backlight unit BL side.

The backlight unit BL is arranged on a side opposed to the first substrate SB1 of the display panel PNL. Various types of units are applicable as the backlight unit BL, but the detailed explanations are omitted. If the display panel PNL is a reflective display panel, the backlight unit BL may be omitted and, instead, a front light unit may be arranged on a side opposed to the second substrate SB2.

The cover glass CG is arranged on the side opposed to the second substrate SB2 of the display panel PNL. In other words, the surface of the display panel PNL opposed to the cover glass CG is planarized without a difference in level between the first substrate SB1 and the second substrate SB2. The cover glass CG has an inner surface CGA opposed to the display panel PNL and an outer surface CGB opposed to the inner surface CGA. The outer surface CGB corresponds to the display surface on which an image is displayed.

The first optical element OD1 is located on the display surface side of the backlight unit BL or between the first substrate SB1 and the backlight unit BL. The second optical element OD2 is located on the display surface side of the second substrate SB2 or between the second substrate SB2 and the cover glass CG. For example, the first optical element OD1 is adhered to the first substrate SB1 while the second optical element OD2 is adhered to the second substrate SB2. Each of the first optical element OD1 and the second optical element OD2 comprises a polarizer and may include a retardation film and other optical films such as a viewing angle expansion film and a scattering film as needed. For example, each of the first optical element OD1 and the second optical element OD2 may be configured as a circular polarizer formed by a combination of a polarizer and a $\lambda/4$-retardation film.

The cover glass CG is adhered to the display surface side of the second substrate SB2. In the example illustrated, an inner surface CGA of the cover glass CG is adhered to the second optical element OD2 by an adhesive AD. The adhesive AD is, for example, a transparent ultraviolet curing resin. The adhesive AD is interposed between the second optical element OD2 and the cover glass CG, and the thickness of the adhesive AD is substantially constant over the first area A1, the second area A2 and the third area A3.

Desirably, the adhesive AD is not in contact with an end surface of the second optical element OD2 in the second area A2 and the third area A3. This prevents swelling of a part of the second optical element OD2 or degradation of an optical performance of the second optical element OD2, which is caused by infiltration of components contained in the adhesive AD into the second optical element OD2 from its end surface. Even if this inconvenience occurs on the end surface of the second optical element OD2, the inconvenience hardly influences the image displayed in the display area DA since, in the third area A3, the second optical element OD2 extends to a position remote from the display area DA.

In the display device DSP of the example illustrated, the backlight unit BL, the first optical element OD1, the first substrate SB1, the liquid crystal layer LC, the second substrate SB2, the second optical element OD2, the adhesive layer AD, and the cover glass CG are arranged sequentially from the backlight unit BL to the display surface (CGB).

Figure 3:
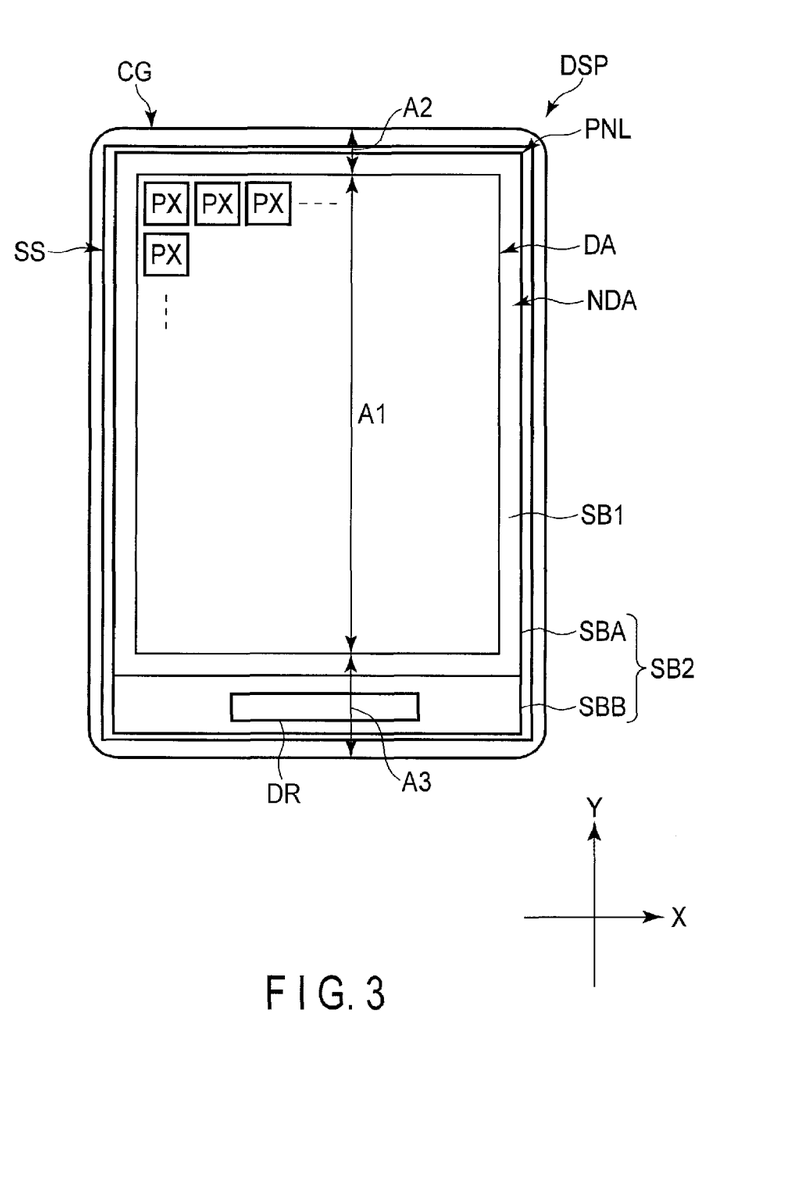
FIG. 3 is a plan view showing another configuration example of the display device DSP of the present embodiment.

FIG. 3 is a plan view showing another configuration example of the display device DSP of the present embodiment.

The configuration example shown in FIG. 3 is different from the configuration example in FIG. 1 with respect to a feature that the display device DSP comprises a sensor substrate SS. In the example illustrated, the sensor substrate SS has an outer shape larger than the display panel PNL and smaller than the cover glass CG. The other constituent features are the same as those shown in FIG. 1 and explanations are omitted.

Figure 4:
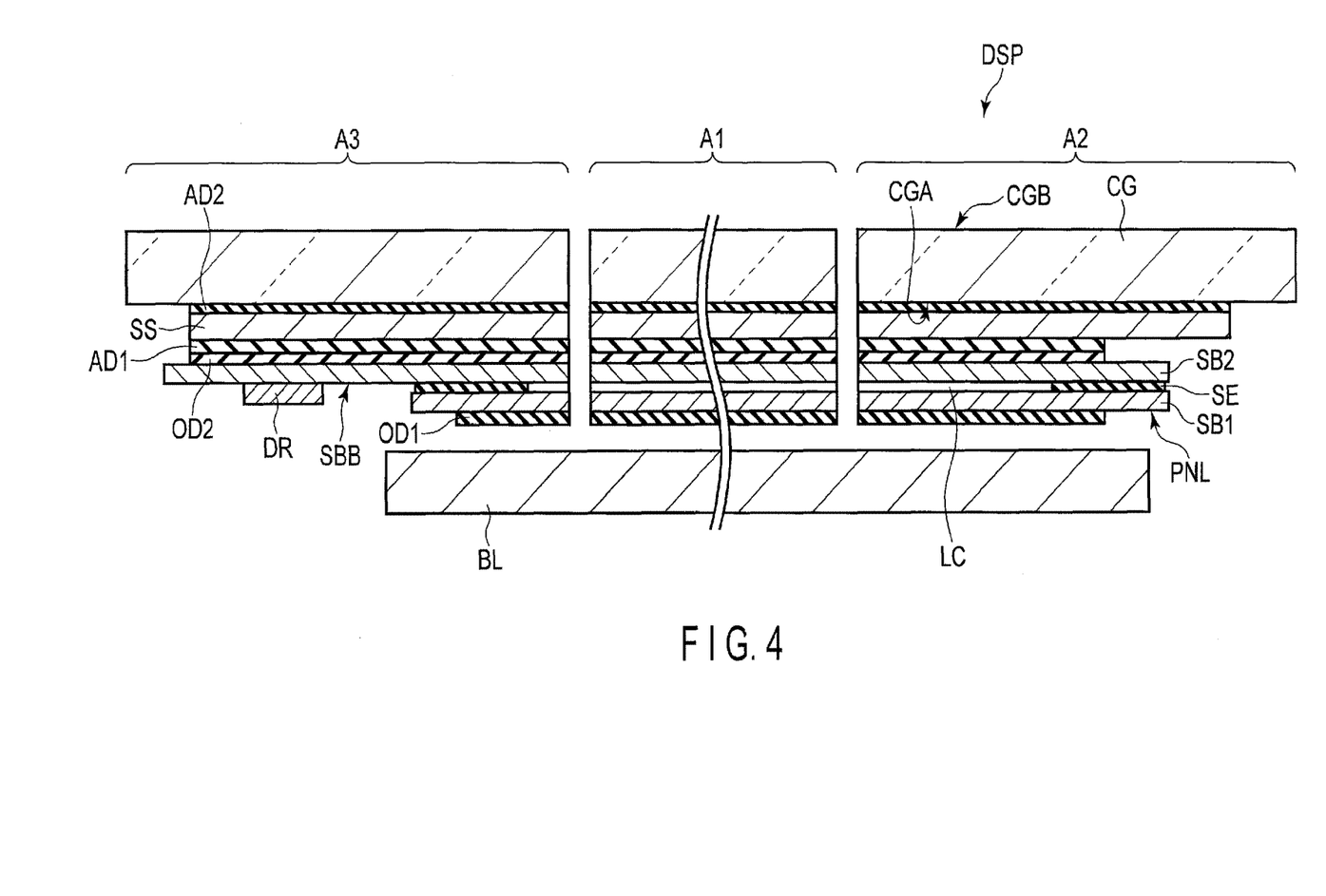
FIG. 4 is a cross-sectional view of the display device DSP shown in FIG. 3 seen along the second direction Y.

FIG. 4 is a cross-sectional view of the display device DSP shown in FIG. 3 seen along the second direction Y.

In the example illustrated, the outer surface CGB of the cover glass CG corresponds to the display surface on which an image is displayed or a detection surface on which an object contacting or approaching the cover glass CG is detected.

The sensor substrate SS includes various electrodes, lines and the like to detect an object on the detection surface, which are not shown in the figure. As a sensor composed of the sensor substrate SS, for example, a capacitive sensor is applicable. Capacitive sensors can be classified into a self-capacitive sensor, a mutual-capacitive sensor and the like, but the sensor in the embodiment may be a sensor in either of the types.

The sensor substrate SS is arranged between the display panel PNL and the cover glass CG. In the example illustrated, the sensor substrate SS is adhered to the second optical element OD2 by an adhesive AD1 and also adhered to the cover glass CG by an adhesive AD2. Each of the adhesive AD1 and the adhesive AD2 is, for example, a transparent ultraviolet curing resin.

Next, a configuration of the display panel PNL will be explained. A configuration to which a display mode using a lateral electric field is applied will be explained here as an example.

Figure 5:
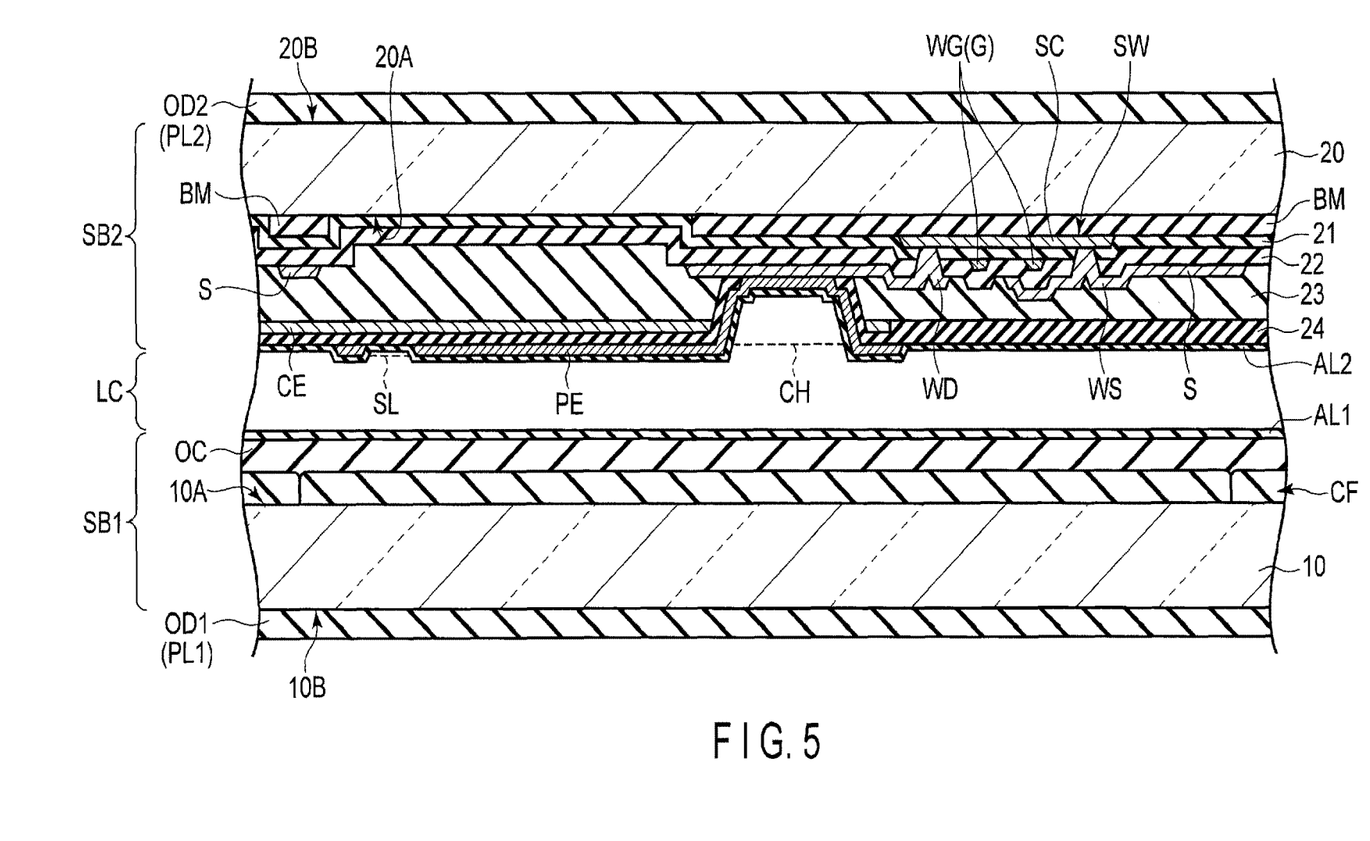
FIG. 5 is a cross-sectional view showing a configuration of the display panel PNL including the switching element SW.

FIG. 5 is a cross-sectional view showing a configuration of the display panel PNL including the switching element SW.

The first substrate SB1 is formed by using a first insulating substrate 10 having a light transmitting property such as a glass substrate or a resin substrate. The first substrate SB1 includes a color filter layer CF, an overcoat layer OC, a first alignment film AL1 and the like, on a side of the first insulating substrate 10, which is opposed to the second substrate SB2.

The color filter layer CF is formed on an inner surface 10A of the first insulating substrate 10, which is opposed to the second substrate SB2. The color filter layer CF includes color filters of colors different from each other. The color filter layer CF includes, for example, a red filter, a green filter and a blue filter, which will be explained later. The color filter layer CF may further include a transparent or white filter. The red filter is formed of a resin material which is colored red, the green filter is formed of a resin material which is colored green, and the blue filter is formed of a resin material which is colored blue.

The overcoat layer OC covers the color filter layer CF. The overcoat layer OC is formed of a transparent resin material. The first alignment film AL1 covers the overcoat layer OC. The first alignment film AL1 is arranged on a surface of the first substrate SB1 which is in contact with the liquid crystal layer LC.

The second substrate SB2 is formed by using a second insulating substrate 20 having a light transmitting property such as a glass substrate or a resin substrate. The second substrate SB2 includes a light-shielding layer BM, a switching element SW, a common electrode CE, a pixel electrode PE, a first insulating film 21, a second insulating film 22, a third insulating film 23, a fourth insulating film 24, a second alignment film AL2 and the like, on a side of the second insulating substrate 20, which is opposed to the first substrate SB1.

The light-shielding layer BM is formed on an inner surface 20A of the second insulating substrate 20, which is opposed to the first substrate SB1. The light-shielding layer BM is formed at a position opposed to line portions such as a gate line G, a source line S and the switching element SW. The light-shielding layer BM formed to be opposed to each of the gate line G and the source line S is shaped in a lattice, which will be explained later. The light-shielding layer BM is formed of, for example, a resin material containing black pigment. The light-shielding layer BM may be formed of, for example, a metal material having a low reflectance such as chromium (Cr) but, in this case, an insulating film should desirably be interposed between the light-shielding layer BM and the lines or between the light-shielding layer and a semiconductor layer SC of the switching element SW.

The semiconductor layer SC of the switching element SW is formed on a side of the light-shielding layer BM which is opposed to the first substrate SB1 and is covered with the first insulating film 21. The first insulating film 21 also covers the light-shielding layer BM and the inner surface 20A of the second insulating substrate 20. A gate electrode WG of the switching element SW is formed integrally with a gate line G, on the side of the first insulating film 21, which is opposed to the first substrate SB1, and is opposed to the semiconductor layer SC. The gate electrode WG and the gate line G are covered with the second insulating film 22. The second insulating film 22 also covers the first insulating film 21.

A source line S, and a source electrode WS and a drain electrode WD of the switching element SW are formed on the side of the second insulating film 22, which is opposed to the first substrate SB1. The source electrode WS is formed integrally with the source line S. The source electrode WS and the drain electrode WD are in contact with the semiconductor layer SC through respective contact holes penetrating the first insulating film 21 and the second insulating film 22. The switching element SW thus configured is coated with the third insulating film 23 as well as the source line S. The third insulating film 23 also covers the second insulating film 22.

The common electrode CE is formed on the side of the third insulating film 23, which is opposed to the first substrate SB1. The common electrode CE is covered with the fourth insulating film 24. The fourth insulating film 24 also covers the third insulating film 23. The pixel electrode PE is formed on the side of the fourth insulating film 24, which is opposed to the first substrate SB1, and faces the common electrode CE. A slit SL is formed at the pixel electrode PE so as to be opposed to the common electrode CE. The pixel electrode PE is in contact with the drain electrode WD of the switching element SW through the contact hole CH penetrating the third insulating film 23 and the fourth insulating film 24. The common electrode CE and the pixel electrode PE are formed of, for example, a transparent conductive material such as indium-tin-oxide (ITO) or indium-zinc-oxide (IZO).

The first insulating film 21, the second insulating film 22, and the fourth insulating film 24 are formed of, for example, an inorganic material such as a silicon oxide or a silicon nitride. The third insulating film 23 is formed of, for example, a transparent organic material such as a resin material.

The pixel electrode PE and the fourth insulating film 24 are covered with the second alignment film AL2. The second alignment film AL2 is arranged on a surface of the second substrate SB2, which is in contact with the liquid crystal layer LC. The first alignment film AL1 and the second alignment film AL2 are formed of, for example, a material which exhibits horizontal alignment properties.

The first alignment film AL1 and the second alignment film AL2 are arranged to face each other, in the first substrate SB1 and the second substrate SB2 explained above. At this time, a predetermined cell gap is formed between the first substrate SB1 and the second substrate SB2 by a spacer (not shown). A liquid crystal layer LC is sealed between the first alignment film AL1 of the first substrate SB1 and the second alignment film AL2 of the second substrate SB2.

The first optical element OD1 including a first polarizer PL1 is adhered to an outer surface 10B opposite to the inner surface 10A, of the first insulating substrate 10. The second optical element OD2 including a second polarizer PL2 is adhered to an outer surface 20B opposite to the inner surface 20A, of the second insulating substrate 20.

Figure 6:
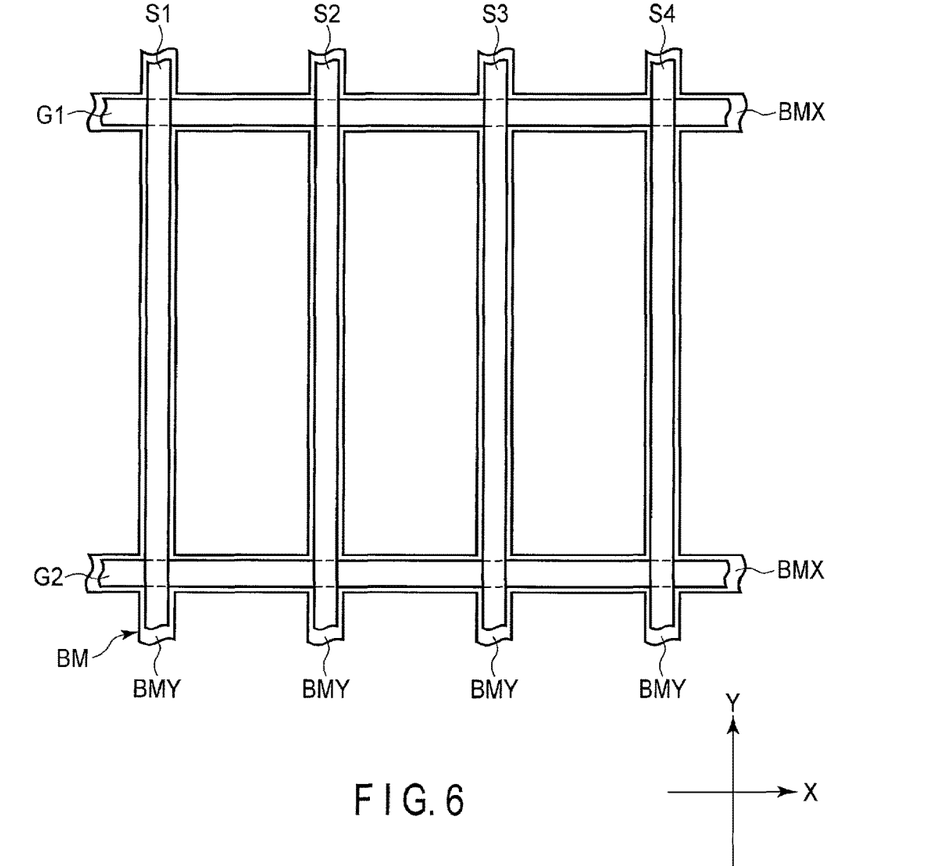
FIG. 6 is a plan view showing an example of a shape of the light-shielding layer BM.

FIG. 6 is a plan view showing an example of a shape of the light-shielding layer BM. Constituent elements necessary for explanations alone are shown in the figure.

In the example illustrated, the gate lines G1 and G2 extend in the first direction X and are arranged in the second direction Y. Source lines S1 to S4 extend in the second direction Y and are arranged in the first direction X.

The light-shielding layer BM includes a first light-shielding portion BMX extending in the first direction X and a second light-shielding portion BMY extending in the second direction Y, which are formed in a lattice shape in the X-Y plane. The first light-shielding portion BMX is laid over each of the gate lines G1 and G2 and has a width greater than or equal to the width of each of the gate lines. The second light-shielding portion BMY is laid over each of the source lines S1 to S4 and has a width greater than or equal to the width of each of the source lines. For example, the first light-shielding portion BMX is formed to be wider than the gate lines and the second light-shielding portion BMY is formed to be wider than the source lines. The switching element SW is not shown in the figure, but the light-shielding layer BM is also laid over the semiconductor layer of the switching element SW as shown in FIG. 5.

According to the present embodiment, in the configuration that the second substrate SB2 including the gate lines G and the source lines S is arranged on the display surface side on which an image is displayed with respect to the first substrate SB1, the light-shielding layer BM is formed on the side of the second insulating substrate 20, which is opposed to the first substrate SB1, and the gate lines G and the source lines S are formed on the side of the light-shielding layer BM, which is opposed to the first substrate SB1, so as to extend along the light-shielding layer BM. For this reason, if external light is made incident on the display surface side, reflection on the line portions such as the gate lines G and the source lines S is suppressed since the external light is absorbed by the light-shielding layer BM. Deterioration in display quality of the image displayed on the display surface can be thereby suppressed.

In addition, the switching element SW comprises the semiconductor layer SC formed on the side of the light-shielding layer BM which is opposed to the first substrate SB1, on the second substrate SB2. For this reason, irradiation of the external light to the semiconductor layer SC can be suppressed and an operation error of the switching element SW, which results from the optical leak, can also be suppressed.

In addition, the second substrate SB2 located on the display surface side with respect to the first substrate SB1 has an outer shape larger than the first substrate SB1, and includes a counter portion SBA opposed to the first substrate SB1 and the mounting portion SBB located on the side outer than the counter portion SBA. The second substrate SB2 is adhered to the cover glass CG, on the display surface side of the second substrate. In other words, the adhesive AD bonding the display panel PNL and the cover glass CG is interposed between the second optical element OD2 and the cover glass CG, and the thickness of the adhesive AD is substantially constant over the first area A1, the second area A2 and the third area A3. For this reason, since the adhesive AD shrinks substantially uniformly in curing, deformation of the display panel PNL, which results from a great local shrinkage, or non-uniformity in the cell gap can be suppressed, and occurrence of the non-uniformity in display can also be suppressed.

In addition, in the configuration in which the sensor substrate SS is arranged between the cover glass CG and the second substrate SB2, the adhesive AD1 interposed between the sensor substrate SS and the second substrate SB2 is interposed between the second optical element OD2 and the cover glass CG, and the thickness of the adhesive AD1 is substantially constant over the first area A1, the second area A2 and the third area A3. In addition, the thickness of the adhesive AD2 interposed between the sensor substrate SS between the cover glass CG is substantially constant over the first area A1, the second area A2 and the third area A3. For this reason, since the adhesives AD1 and AD2 shrink substantially uniformly in curing, deformation of the display panel PNL or non-uniformity in the cell gap can be suppressed, and occurrence of the non-uniformity in display can also be suppressed.

Even if a pressurizing force is applied from the outside to the outer surface CGB of the cover glass CG, the pressurizing force can hardly be applied to the signal supply source and damage to the signal supply source can be reduced since the signal supply source mounted on the mounting portion SBB of the second substrate SB2 faces the side opposite to the cover glass CG.

Figure 12:
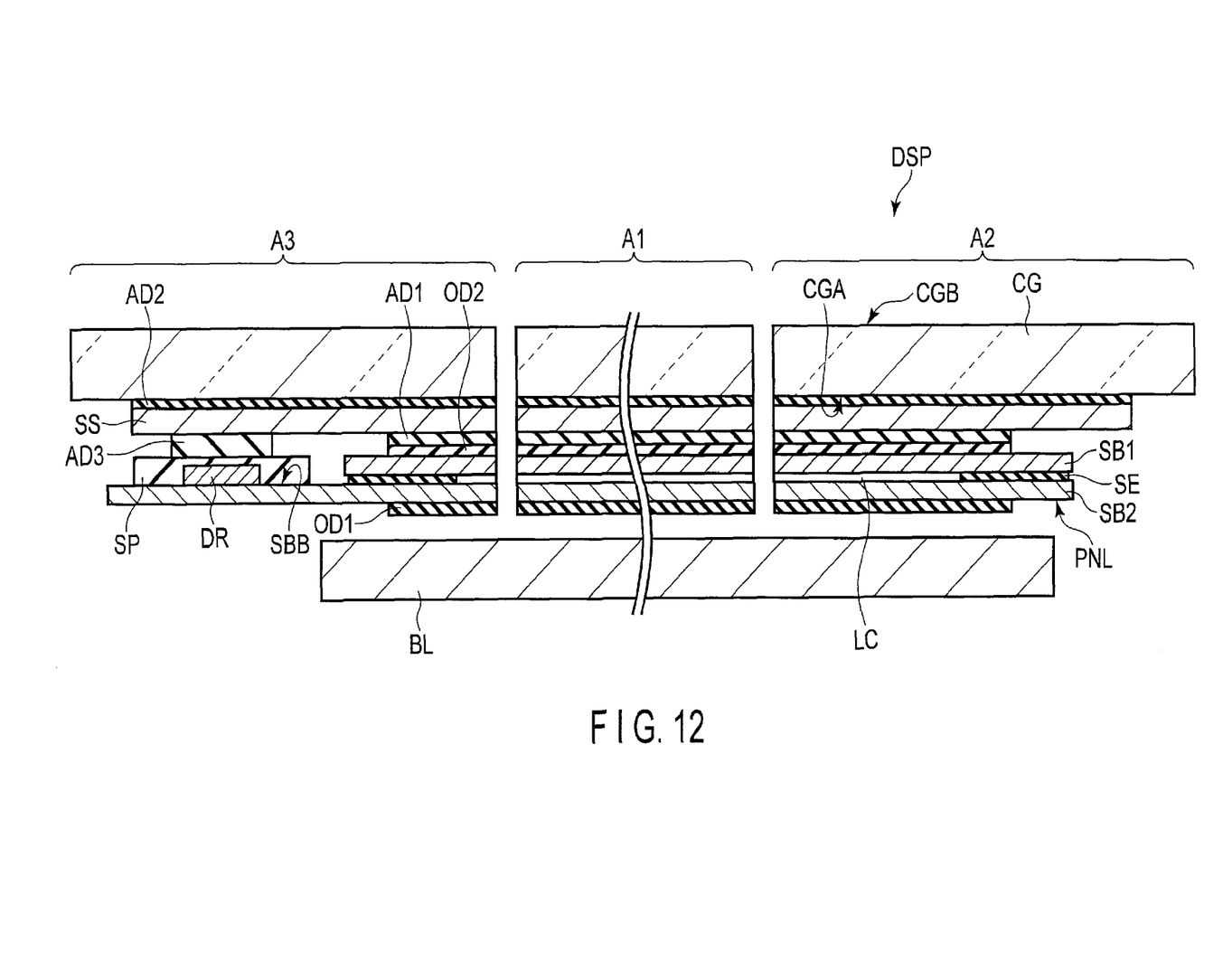
FIG. 12 is a cross-sectional view showing the display device DSP of a comparative example.

FIG. 12 is a cross-sectional view showing the display device DSP of a comparative example.

The display device DSP of the comparative example shown in the figure is different from the display device of the present embodiment as shown in, for example, FIG. 4 with respect to the features that the second substrate SB2 is located on the backlight unit BL side and that the first substrate SB1 is located on the cover glass CG side. In the comparative example, projections and depressions are formed on the side of the display panel PNL, which is opposed to the cover glass CG. In other words, the first substrate SB1 is different in level from the mounting portion SBB of the second substrate SB2, and the signal supply source such as the driving IC chip DR is mounted on the mounting portion SBB so as to face the side opposed to the cover glass CG, on the side of the display panel PNL, which is opposed to the cover glass CG. For this reason, a gap between the display panel PNL and the cover glass CG or the sensor substrate SS does not become uniform. In the example illustrated, the second optical element OD2 and the sensor substrate SS are adhered to each other by the adhesive ADI, and a spacer member SP which protects the driving IC chip DR is adhered to the sensor substrate SS by an adhesive AD3. The adhesive AD1 and the adhesive AD3 may not have a uniform thickness. In addition, in some cases, a material having a comparatively low viscosity is applied to the adhesive AD1 to form a substantially uniform thickness in a wide range, and a material having a high viscosity is applied to the adhesive AD3 to form a thickness greater than the adhesive AD1. In the comparative example, when the adhesive AD1 and the adhesive AD3 are cured and shrunk, the display panel PNL may deform or non-uniformity in the cell gap may occur due to the difference in thickness, the difference in physical properties and the like between the adhesive AD1 and the adhesive AD3. In addition, if a pressurizing force is applied from the outside to the outer surface CGB of the cover glass CG, the pressurizing force can easily be applied to the signal supply source and the signal supply source can easily be damaged since the signal supply source mounted on the mounting portion SBB faces the side opposite to the cover glass CG. In other words, the above-explained advantage of the present embodiment cannot be obtained from the display device DSP of the comparative example.

Next, a concrete configuration example of the display panel PNL will be explained. In the following descriptions, the same constituent elements as those explained above are denoted by like reference numerals and their explanations are omitted. In addition, constituent elements necessary for explanations alone are shown in each figure.

Figure 7:
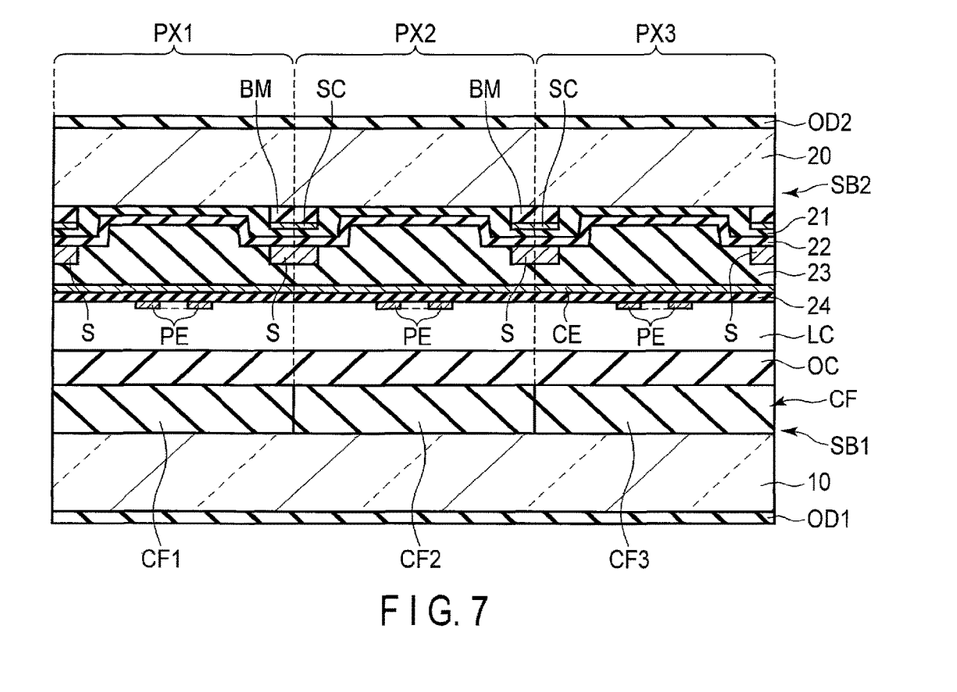
FIG. 7 is a cross-sectional view showing a first configuration example of the display panel PNL.

FIG. 7 is a cross-sectional view showing a first configuration example of the display panel PNL.

The first substrate SB1 includes a color filter layer CF on the side of the first insulating substrate 10, which is opposed to the second substrate SB2. The color filter layer CF includes a color filter CF1 which transmits a first color, a second color filter CF2 which transmits a second color different from the first color, and a third color filter CF3 which transmits a third color different from the first color and the second color. The first to third color filters CF1 to CF3 are covered with the overcoat layer OC. For example, the first color is red, the second color is green, and the third color is blue. The first color filter CF1 is arranged to correspond to a first pixel PX1, the second color filter CF2 is arranged to correspond to a second pixel PX2, and the third color filter CF3 is arranged to correspond to a third pixel PX3.

In the second substrate SB2, the light-shielding layer BM is formed on the inner surface 20A of the second insulating substrate 20 and arranged at each of boundaries of the first to third pixels PX1 to PX3. The semiconductor layer SC is stacked on the side of the light-shielding layer BM, which is opposed to the first substrate SB1. The first insulating film 21 covers the light-shielding layer BM and the semiconductor layer SC. The source line S is formed on the side of the second insulating film 22, which is opposed to the first substrate SB1, just under the light-shielding layer BM. The common electrode CE is arranged over the first to third pixels PX1 to PX3. The pixel electrode PE is arranged at each of the first to third pixels PX1 to PX3.

The above-described advantage can be obtained from the first configuration example. In addition, the color filter layer CF is arranged in the first substrate SB1 while the switching element SW formed in a process at a comparatively high temperature is arranged in the second substrate SB2, and the color filter layer CF is not exposed to the high-temperature process. For this reason, fading of the color filter layer CF can be suppressed.

Figure 8:
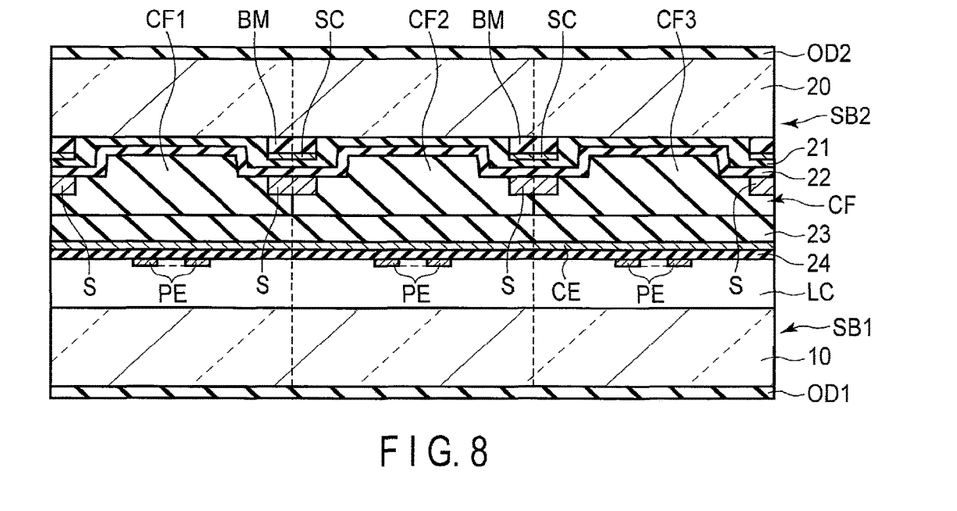
FIG. 8 is a cross-sectional view showing a second configuration example of the display panel PNL.

FIG. 8 is a cross-sectional view showing a second configuration example of the display panel PNL.

The second configuration example is different from the first configuration example with respect to a feature that the color filter layer CF is arranged between the second insulating substrate 20 and the pixel electrode PE in the second substrate SB2. In the example illustrated, the color filter layer CF is arranged between the second insulating film 22 and the third insulating film 23. The semiconductor layer SC included in the switching element SW is formed on the side closer to the second insulating substrate 20 than to the color filter layer CF. In other words, the color filter layer CF is located between the pixel electrode PE and the semiconductor layer SC.

In the second configuration example, the above-explained advantage can be obtained, and fading of the color filter layer CF can be suppressed without exposing the color filter layer CF to a high-temperature process since the color filter layer CF is formed after formation of the switching element SW in the second substrate SB2. In addition, the structure can be simplified and the manufacturing costs can be reduced since the color filter layer CF and the overcoat layer OC are unnecessary in the first substrate SB1. Furthermore, the thickness of the overall display panel PNL can be reduced.

Figure 9:
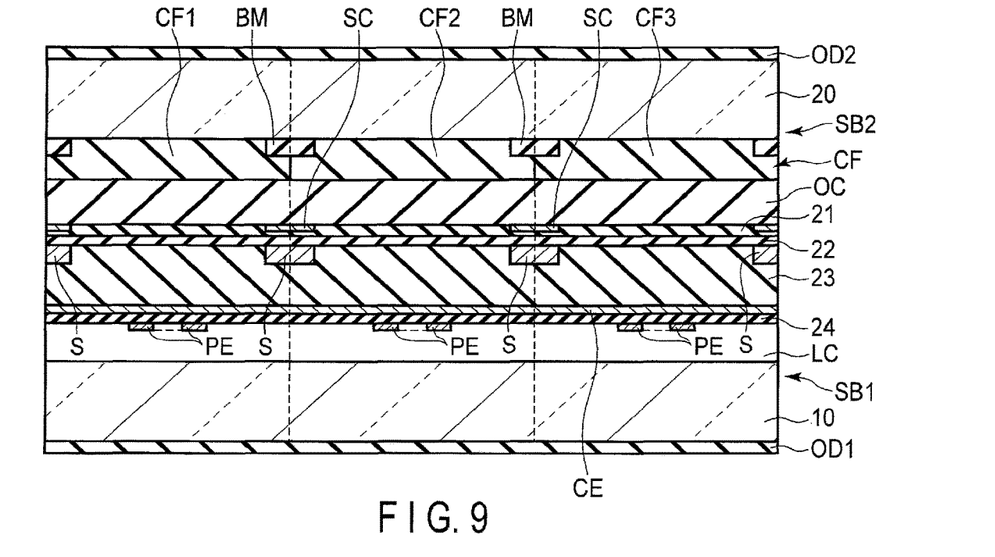
FIG. 9 is a cross-sectional view showing a third configuration example of the display panel PNL.

FIG. 9 is a cross-sectional view showing a third configuration example of the display panel PNL.

The third configuration example is different from the second configuration example with respect to a feature that the color filter layer CF is arranged between the second insulating substrate 20 and the first insulating film 21 in the second substrate SB2. In the example illustrated, the color filter layer CF is formed on the inner surface 20A of the second insulating film 20 and partially overlap the side of the light shielding layer BM, which is opposed to the first substrate SB1. The color filter layer CF is covered with the overcoat layer OC. The semiconductor layer SC is formed on the side of the overcoat layer OC, which is opposed to the first substrate SB1, and is covered with the first insulating film 21. In other words, the semiconductor layer SC included in the switching element SW is formed on the side closer to the first substrate SB1 than to the color filter layer CF. That is, the color filter layer CF is located between the light-shielding layer BM and the semiconductor layer SC.

In the third configuration example, the above-explained advantage can be obtained, and the distance between the switching element SW and the pixel electrode PE in the thickness direction of the second substrate SB2 can be reduced since the color filter layer CF is not interposed between the pixel electrode PE and the switching element SW including the semiconductor layer SC. That is, as shown in FIG. 5, the contact hole CH to make electric connection between the switching element SW and the pixel electrode PE can be formed so as to be shallow, the projections and depressions on the surface of the second substrate SB2 on the liquid crystal layer LC side can be reduced, the contact hole CH can be formed so as to have small diameter, and reduction of the area contributing to the display can be suppressed. In addition, the contact hole CH in a stable shape can be formed since optical absorption of the color filter CF gives no influence to the formation of the contact hole CH.

Figure 10:
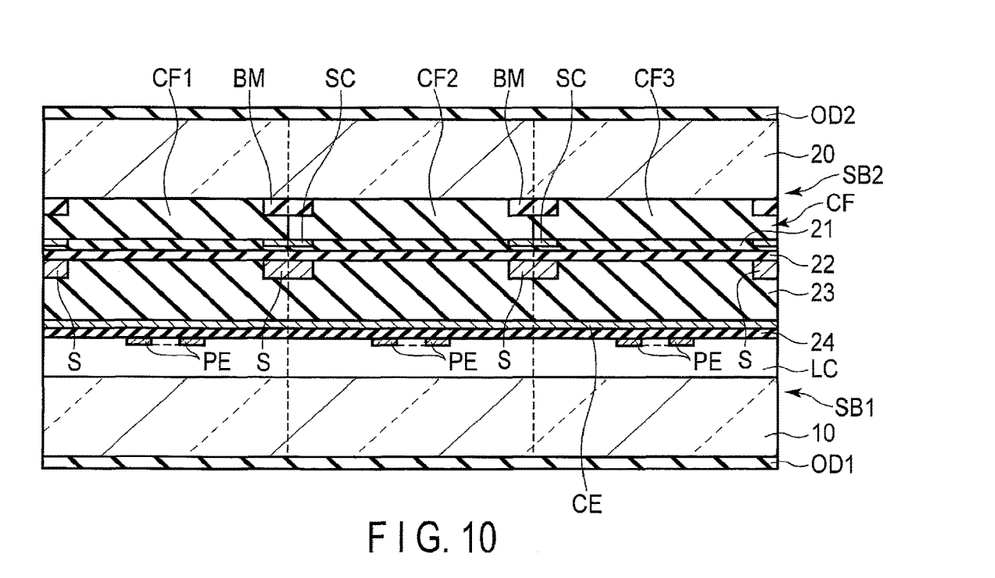
FIG. 10 is a cross-sectional view showing a fourth configuration example of the display panel PNL.

FIG. 10 is a cross-sectional view showing a fourth configuration example of the display panel PNL.

The fourth configuration example is different from the third configuration example with respect to a feature that the overcoat layer is not arranged in the second substrate SB2.

In the example illustrated, the color filter layer CF is formed on the inner surface 20A of the second insulating film 20 and partially overlap the side of the light shielding layer BM, which is opposed to the first substrate SB1. The color filter layer CF is covered with the first insulating film 21. The semiconductor layer SC is formed on the side of the color filter layer CF, which is opposed to the first substrate SB1, and is covered with the first insulating film 21. That is, the color filter layer CF is located between the light-shielding layer BM and the semiconductor layer SC.

In the fourth configuration example, the same advantages as those of the above-described third configuration example can be obtained, and the structure can be simplified and the manufacturing costs can be reduced since the overcoat layer OC is unnecessary in the second substrate SB2. Furthermore, the thickness of the overall display panel PNL can be reduced.

Figure 11:
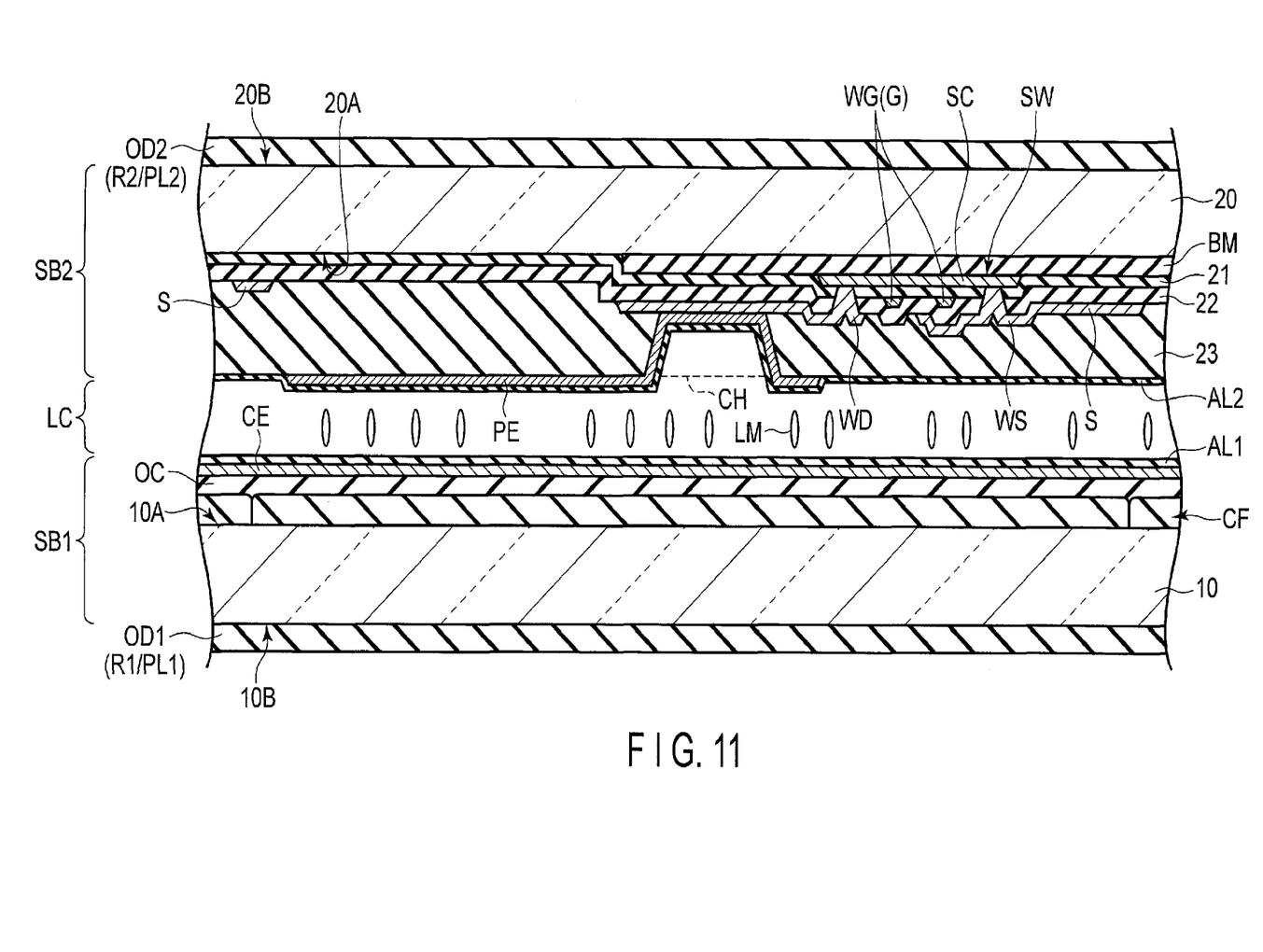
FIG. 11 is a cross-sectional view showing a configuration of a display panel PNL of another embodiment.

Next, another embodiment will be explained. The configuration wherein the second substrate SB2 includes the common electrode CE opposed to the pixel electrode PE has been explained in the above-described embodiment, but is not limited. In the embodiment described below, a second substrate SB2 includes a pixel electrode PE while a first substrate SB1 includes a common electrode CE on the side of a first insulating substrate 10, which is opposed to the second substrate SB2.

FIG. 11 is a cross-sectional view showing a configuration of a display panel PNL of another embodiment.

The first substrate SB1 includes a color filter layer CF, an overcoat layer OC, the common electrode CE, a first alignment film AL1 and the like, on the side of the first insulating substrate 10, which is opposed to the second substrate SB2. The color filter layer CF is formed on an inner surface 10A of the first insulating substrate 10, which is opposed to the second substrate SB2. The overcoat layer OC covers the color filter layer CF. The common electrode CE is formed on the side of the overcoat layer OC, which is opposed to the second substrate SB2. The first alignment film AL1 covers the common electrode CE.

The second substrate SB2 includes a light-shielding layer BM, a switching element SW, the pixel electrode PE, a first insulating film 21, a second insulating film 22, a third insulating film 23, a second alignment film AL2 and the like, on a side of a second insulating substrate 20, which is opposed to the first substrate SB1.

The light-shielding layer BM is formed on an inner surface 20A of the second insulating substrate 20, which is opposed to the first substrate SB1. Details of the switching element SW are not explained here, but a semiconductor layer SC of the switching element SW is formed on the side of the light-shielding layer BM, which is opposed to the first substrate SB1, and is covered with the first insulating film 21. A gate electrode WG of the switching element SW is formed integrally with a gate line G, on the side of the first insulating film 21, which is opposed to the first substrate SB1, and is opposed to the semiconductor layer SC. A source line S, and a source electrode WS and a drain electrode WD of the switching element SW are formed on the side of the second insulating film 22, which is opposed to the first substrate SB1. The pixel electrode PE is formed on the side of the third insulating film 23, which is opposed to the first substrate SB1. The pixel electrode PE is opposed to the common electrode CE. The pixel electrode PE is in contact with the drain electrode WD of the switching element SW through a contact hole CH penetrating the third insulating film 23. The second alignment film AL2 covers the pixel electrode PE and the third insulating film 23. The first alignment film AL1 and the second alignment film AL2 are formed of, for example, a material which exhibits vertical alignment properties.

A liquid crystal layer LC is sealed between the first alignment film AL1 of the first substrate SB1 and the second alignment film AL2 of the second substrate SB2. The liquid crystal layer LC is formed of, for example, a negative liquid crystal material having a negative dielectric anisotropy. Liquid crystal molecules LM contained in the liquid crystal layer LC are aligned substantially vertically to the first substrate SB1 and the second substrate SB2, in a state in which an electric field is not formed between the pixel electrode PE and the common electrode CE.

An alignment control module configured to control alignment of the liquid crystal molecules LM should desirably be arranged in at least one of the first substrate SB1 and the second substrate SB2, though not shown in the figure. Examples of the alignment control module include a slit or a protrusion formed on at least one of the common electrode CE and the pixel and the pixel electrode PE, and the like.

Each of a first optical element OD1 adhered to an outer surface 10B of the first insulating substrate 10 and a second optical element OD2 adhered to an outer surface 20B of the second insulating substrate 20 has a function of, for example, a circular polarizer. For example, the first optical element OD1 comprises a first polarizer PL1 and a first retardation film R1 corresponding to a quarter-wave plate. The first retardation film R1 is stacked on the first insulating substrate 10 side of the first polarizer PL1. In addition, the second optical element OD2 comprises a second polarizer PL2 and a second retardation film R2 corresponding to a quarter-wave plate. The second retardation film R2 is stacked on the second insulating substrate 20 side of the second polarizer PL2. Each of the first optical element OD1 and the second optical element OD2 may further include a retardation film corresponding to a half-wave plate. That is, the influence of dispersion of the wavelength of each retardation film can be reduced by combining the quarter-wave plate and the half-wave plate.

In the present embodiment, if external light is made incident on the display surface side, the second optical element OD2 absorbs the external light and the reflection on the line portions such as the gate lines G and the source lines S is suppressed since the second optical element OD2 arranged on the display surface side has a function of the circular polarizer. Deterioration in display quality of the image displayed on the display surface can be thereby suppressed.

In the example shown in FIG. 11, the light-shielding portion BM on the display surface side may be omitted rather than the line portions such as the gate line G and the source line S from the viewpoint of suppressing reflection of the external light. However, the light-shielding portion BM should desirably be arranged on the display surface side rather than the semiconductor layer SC, from the viewpoint of suppressing irradiation of the external light to the semiconductor layer SC.

The color filter layer CF is arranged in the first substrate SB1 in the example shown in FIG. 11, but may be arranged in the second substrate SB2, similarly to the second to fourth configuration examples shown in FIG. 8 to FIG. 10.

As described above, the present embodiment can provide a liquid crystal display device capable of improving the display quality.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a backlight unit;
a first substrate including a first insulating substrate; and
a second substrate including a second insulating substrate arranged on a display surface side on which an image is displayed to the first substrate, a light-shielding layer arranged on a side of the second insulating substrate, which is opposed to the first substrate, a gate line and a source line arranged on a side of the light-shielding layer, which is opposed to the first substrate, to extend along the light-shielding layer, a switching element electrically connected to the gate line and the source line, a color filter layer covering the switching element, a pixel electrode electrically connected to the switching element, an overcoat layer located between the color filter layer and the pixel electrode, and a signal supply source,
wherein
the first substrate is located between the backlight unit and the second substrate,
the light-shielding layer directly contacts the second insulating substrate,
the second substrate is larger than the first substrate and includes a counter portion opposed to the first substrate and a mounting portion which is located on an outer side than the counter portion,
the signal supply source is mounted on a side of the mounting portion, which is opposed to the backlight unit,
the switching element comprises a semiconductor layer arranged on a side of the light-shielding layer, which is opposed to the first substrate,
the semiconductor layer directly contacts the light-shielding layer,
the overcoat layer directly contacts the color filter layer, and
a thickness of the color filter in a position overlapping the pixel electrode is greater than a thickness of the color filter in a position overlapping the source line.

2. The display device of claim 1, further comprising:
a liquid crystal layer held between the first substrate and the second substrate,
wherein the second substrate further includes a common electrode opposed to the pixel electrode and is located between the pixel electrode and the color filter layer.

3. The display device of claim 1, further comprising:
a cover glass arranged on the display surface side of the second substrate.

4. The display device of claim 3, further comprising:
a sensor substrate located between the cover glass and the second substrate to detect an object which contacts or approaches the cover glass.

5. The display device of claim 3, further comprising:
an optical element located between the cover glass and the mounting portion overlapping the signal supply source.

6. The display device of claim 1, wherein the signal supply source does not overlap the backlight unit.

* * * * *